United States Patent
Lewis

(10) Patent No.: US 6,467,549 B1
(45) Date of Patent: Oct. 22, 2002

(54) HORSESHOE WITH IMPROVED TRACTION AND CUSHIONING FEATURES

(76) Inventor: Alistair Donald Lewis, 10 Karoola Crescent, Lindisfarne, Tasmania 7015 (AU)

( * ) Notice: Subject to any disclaimer, the term of this patent is extended or adjusted under 35 U.S.C. 154(b) by 0 days.

(21) Appl. No.: 09/623,449

(22) PCT Filed: Mar. 5, 1998

(86) PCT No.: PCT/AU98/00136
§ 371 (c)(1),
(2), (4) Date: Sep. 5, 2000

(87) PCT Pub. No.: WO98/38852
PCT Pub. Date: Sep. 11, 1998

(51) Int. Cl.$^7$ .................................................. A01L 1/02
(52) U.S. Cl. ............................................. 168/24; 168/4
(58) Field of Search ....................................... 168/4, 24

(56) References Cited

U.S. PATENT DOCUMENTS

| 295,616 A | * | 3/1884 | Caspari | ........................ 168/24 |
| 356,007 A | | 1/1887 | Nelson | |
| 468,252 A | | 2/1892 | Moore | |

(List continued on next page.)

FOREIGN PATENT DOCUMENTS

| AU | 304 | 2/1882 |
| AU | 20936 | 12/1941 |
| AU | 25296 | 8/1947 |
| AU | 32616 | 4/1954 |
| AU | 54395 | 4/1968 |
| AU | 61089 | 7/1972 |
| AU | 76512 | 11/1978 |
| AU | 80686 | 4/1980 |
| AU | 80687 | 4/1980 |
| AU | 69042 | 1/1981 |
| AU | 65139/80 | 6/1981 |
| AU | 17251/83 | 2/1984 |
| AU | 89105 | 6/1984 |
| AU | 97881 | 9/1987 |
| AU | 27042/88 | 6/1989 |
| AU | 108767 | 8/1990 |
| AU | 31094/93 | 7/1993 |
| AU | 118486 | 10/1993 |
| AU | 129533 | 3/1997 |
| AU | 50973 | 12/2000 |
| CA | 587601 | 5/1977 |
| FR | 2647637 | 6/1989 |
| GB | 121 of 1896 | 1/1896 |
| GB | 278873 | 10/1927 |

(List continued on next page.)

*Primary Examiner*—Robert P. Swiatek
(74) *Attorney, Agent, or Firm*—McKee, Voorhees & Sease, P.L.C.

(57) ABSTRACT

A horseshoe (2) comprising a base portion (4) having a base surface (8), see FIG. 7, which, in use, is adjacent the hoof of a horse, an integral flange portion (6) which projects downwardly from the base portion (4), the flange portion (6) extending substantially along the entire length of the base portion (4), the flange portion (6) comprising, in cross section, first, second, third and fourth portions (30, 22, 18, 34), see FIG. 7, the first and third portions (30, 18) being substantially straight and the first portion (30) defining at least in part an outer side of the horseshoe (2), the second portion (22) being a convex curve merging smoothly into the first and third portions (30, 18), the fourth portion (34) being a concave curve which merges smoothly from the third portion (18) to the base portion (4), the first and third portions (30, 18) forming a wedge shape which decreases in width in a direction away from the base portion (4), whereby, in use, the wedge shape provides a cushioning effect to the horseshoe (2) as it strikes the ground, the reaction forces increasing as the wedge shape increases penetration into the ground.

25 Claims, 8 Drawing Sheets

U.S. PATENT DOCUMENTS

| | | |
|---|---|---|
| 469,335 A | 2/1892 | Smith |
| 474,751 A | 5/1892 | Lundwall |
| 721,888 A | 3/1903 | Hamilton |
| 809,688 A | 1/1906 | Howard |
| 859,495 A | 7/1907 | Heisler |
| 1,070,507 A | 8/1913 | Mercandelli |
| 1,629,083 A | 5/1927 | Meade |
| 2,084,812 A | 6/1937 | Langlois |
| 2,101,070 A | 12/1937 | Kelley |
| 2,197,166 A | 4/1940 | Wheeler et al. |
| 2,679,906 A | 6/1954 | McGraw et al. |
| 2,742,969 A | 4/1956 | Burton |
| 3,340,933 A | 9/1967 | McGraw et al. |
| 3,794,120 A | 2/1974 | Charlson |
| 4,207,947 A | 6/1980 | Cope et al. |
| 4,265,315 A | 5/1981 | Thomas |
| 4,299,288 A | 11/1981 | Peacock |
| 4,993,494 A | 2/1991 | Tuunanen |
| 5,004,052 A | 4/1991 | Appleton |
| 5,158,143 A | 10/1992 | Campbell |

FOREIGN PATENT DOCUMENTS

| | | |
|---|---|---|
| GB | 27444 of 1930 | 12/1930 |
| GB | 430043 | 6/1935 |
| GB | 1030529 | 5/1966 |
| GB | 1807 of 1863 | 3/2000 |
| WO | 83/03949 | 11/1983 |
| WO | 88/05260 | 7/1988 |
| WO | 94/22296 | 10/1994 |

* cited by examiner

HORSESHOE WITH IMPROVED TRACTION AND CUSHIONING FEATURES

This invention relates to horseshoes:

One object of the invention is to provide a horseshoe which has improved traction, particularly on soft surfaces such as dirt, turf, grass, grit, sand or a wet or damp running rack or the like.

Another object of the invention is to provide a horseshoe which has improved cushioning so as to lessen the likelihood of injury to the hooves or legs of the horse to which the horseshoe is fitted.

According to the present invention there is provided a horseshoe comprising:

a base portion having a base surface which, in use, is adjacent the hoof of a horse; and an integral flange portion which projects downwardly from the base portion, said flange portion extending substantially along the entire length of the base portion;

said flange portion comprising, in cross-section, first, second, third and fourth portions, the first and third portions being substantially straight and the first portion defining at least in part an outer side of the horseshoe;

the second portion being a convex curve merging smoothly into the first and third portions;

the fourth portion being a concave curve which merges smoothly from the third portion to the base portion; and wherein the first and third portions forming a wedge shape which decreases in width in a direction away from the base portion;

whereby, in use, the wedge shape provides a cushioning effect to the shoe as it strikes the ground, the reaction forces increasing as the wedge shape increases penetration into the ground.

Preferably, the integral projection comprises a rib.

Preferably further, the rib tapers, in cross section, in a direction away from said lower face.

Preferably further, the rib has a rounded lower edge.

Preferably further, the depth of the rib as measured from said upper surface is about plus or minus 50% of the width of the base of the horseshoe.

Preferably further, the rib has rounded trailing edges.

In accordance with a further embodiment of the invention, the horseshoe may include lateral outward extensions on the trailing end of the shoes. Such extensions are useful for trotters and/or pacers.

The invention will now be further described with reference to the accompanying drawings in which.

Figure 1:
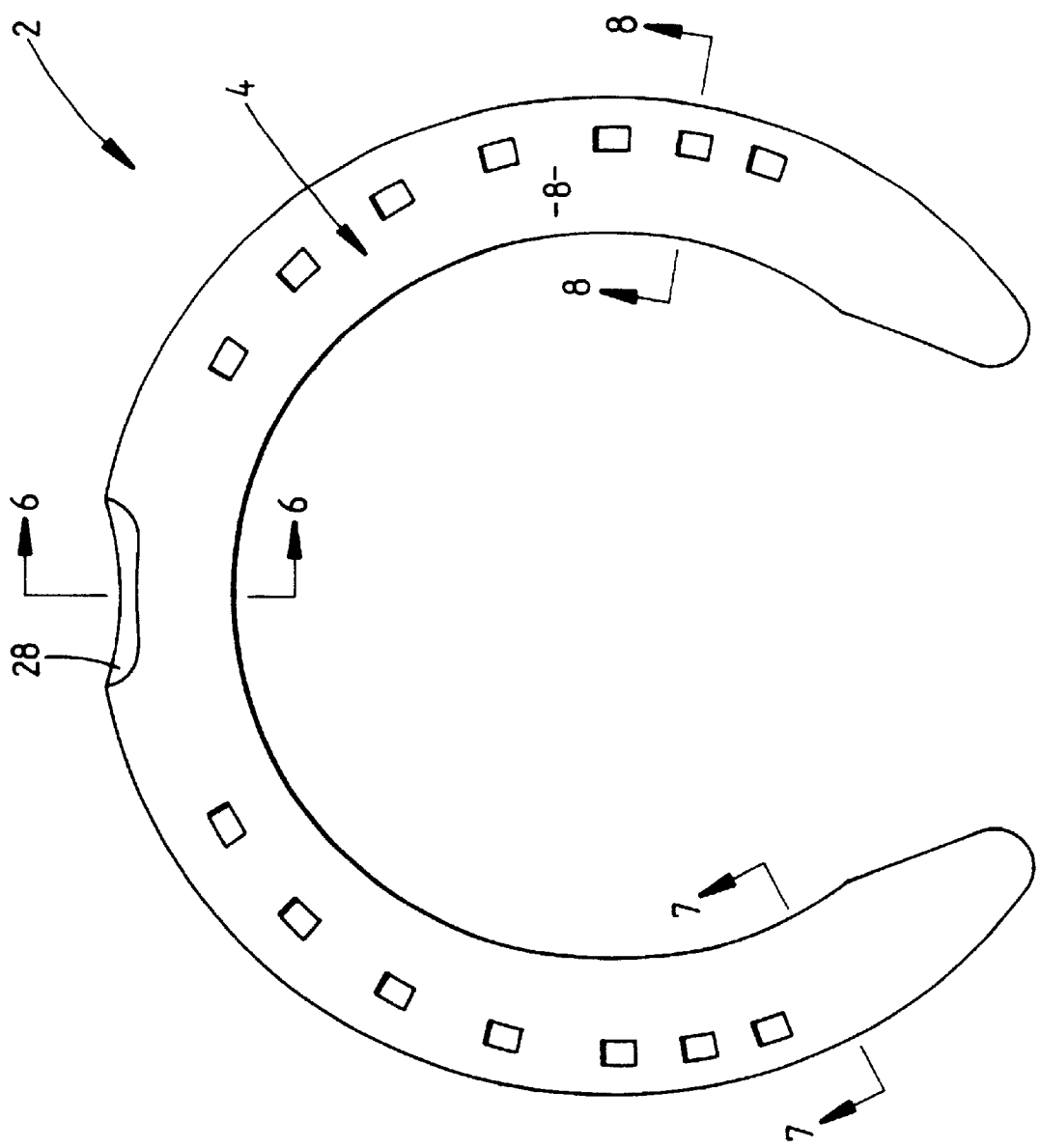
FIG. 1 is a plan view of a horseshoe constructed in accordance with the invention.

The drawings show a horseshoe 2 having a generally U-shaped base portion 4 and a downwardly projecting rib 6. The base portion 4 has a planar upper face 8 which in use is normally adjacent to the bottom or sole of the hoof of a horse. The base portion 4 has a thickness T in the range 1.5 to 3 mm and preferably 2 mm.

Figure 2:
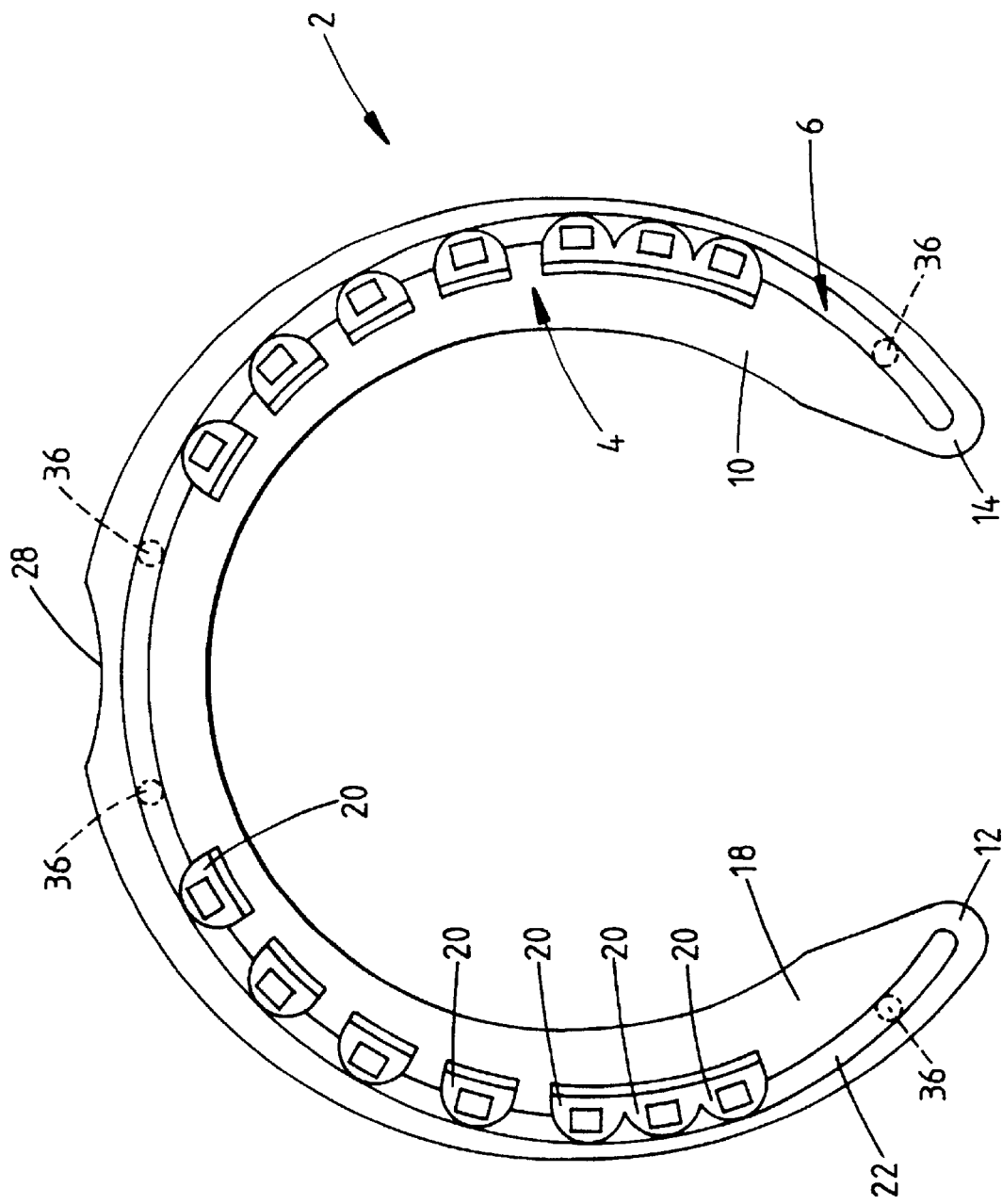
FIG. 2 is an underside view of the horseshoe.
Figure 4:
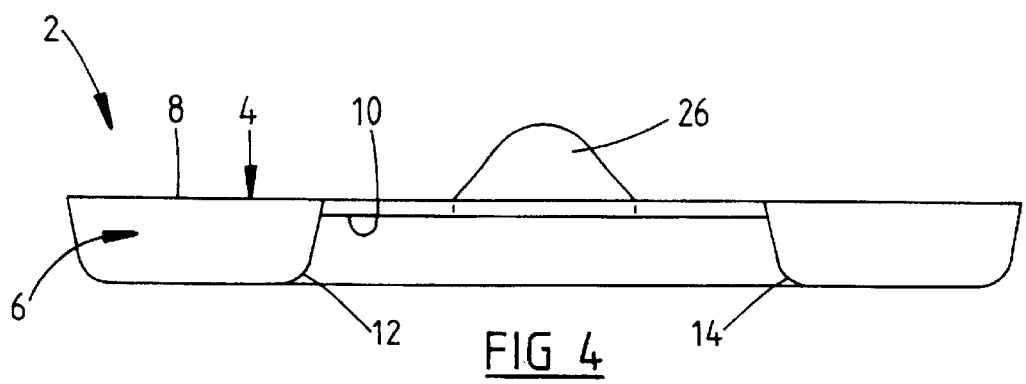
FIG. 4 is a rear view of the horseshoe.

As best seen in FIGS. 2 and 4, the rib 6 projects downwardly from the underside surface 10 of the base 4 of the horseshoe. The rib 6 extends substantially the whole extent of the horseshoe except that it has rounded trailing edges, 12 and 14, as seen in FIG. 4. It is preferred that the rib has no sharp edges which could cause injury to the horse to which the horseshoe is fitted. It is therefore preferred that the rib is in the form of a single continuous rib which extends substantially along the whole length of the base 4, as shown, but it will be appreciated that the rib could be in two or more segments.

Figure 8:
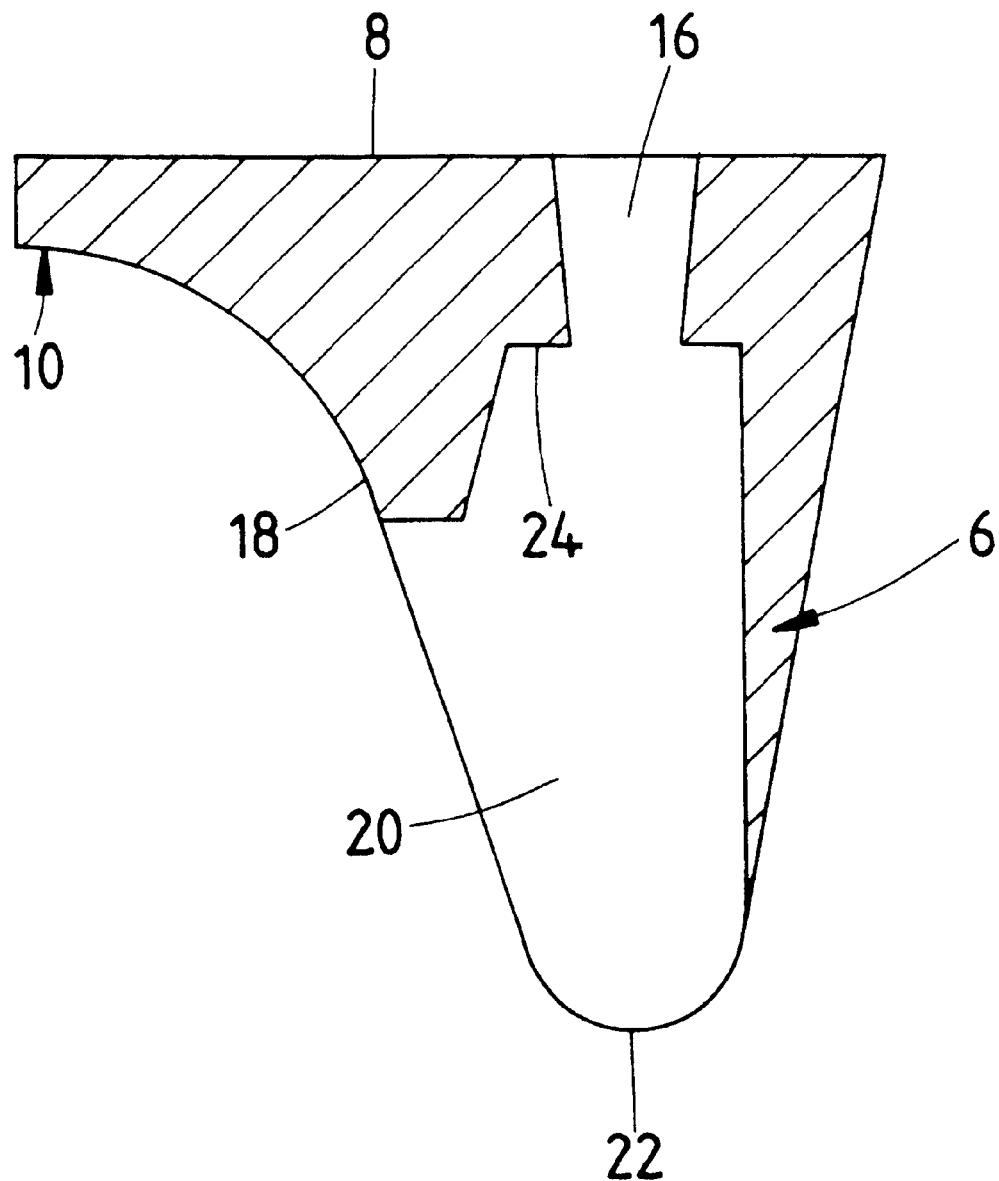
FIG. 8 is a schematic sectional view along the line 8—8 of FIG. 1.

As best seen in FIGS. 1 and 2, the horseshoe includes a plurality of nail holes 16. Preferably there are five nail holes. The number and disposition of the nail holes can be varied in accordance with known principles. In order to accommodate the heads of the nails, the inner face 18 of the rib includes nail hole rebates 20 which allow the head of the nails to be driven into the horseshoe such that the heads lie well below the bottom edge 22 of the rib. As best seen in FIG. 8, each nail hole rebate 20 includes an optional shoulder 24 against which the heads of the nails can be driven. The shoulder 24 is somewhat below the level of the underside surface 10 of the base 4, as shown in FIG. 8. In FIG. 2 the rebates 20 are rounded but straight sided rebates are an alternative.

Figure 3:
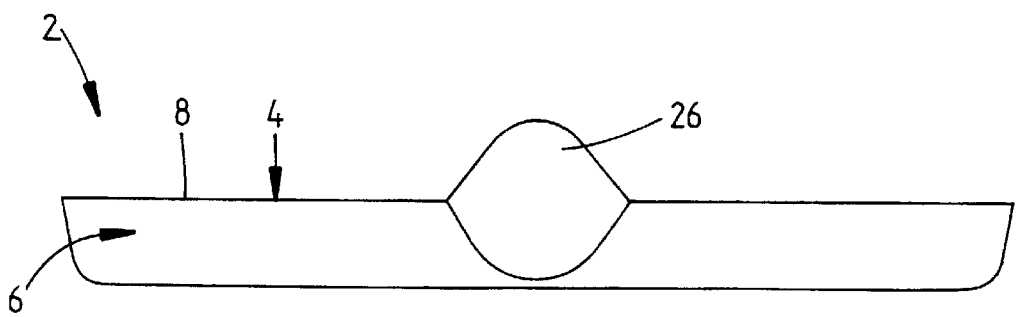
FIG. 3 is a frontal view of the horseshoe.
Figure 5:
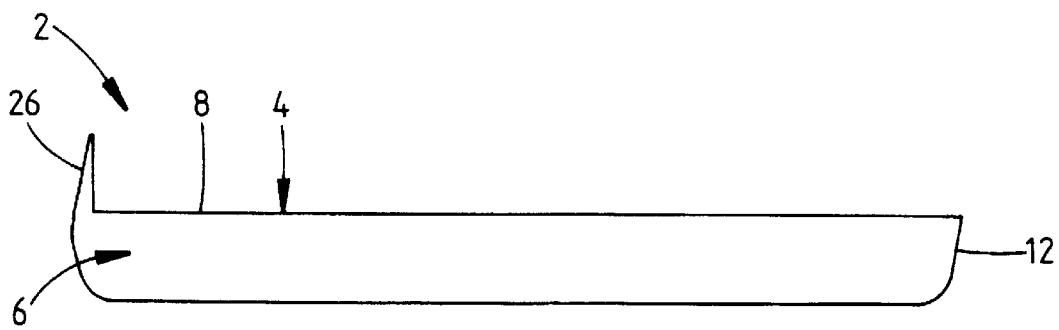
FIG. 5 is a side view of the horseshoe.
Figure 6:
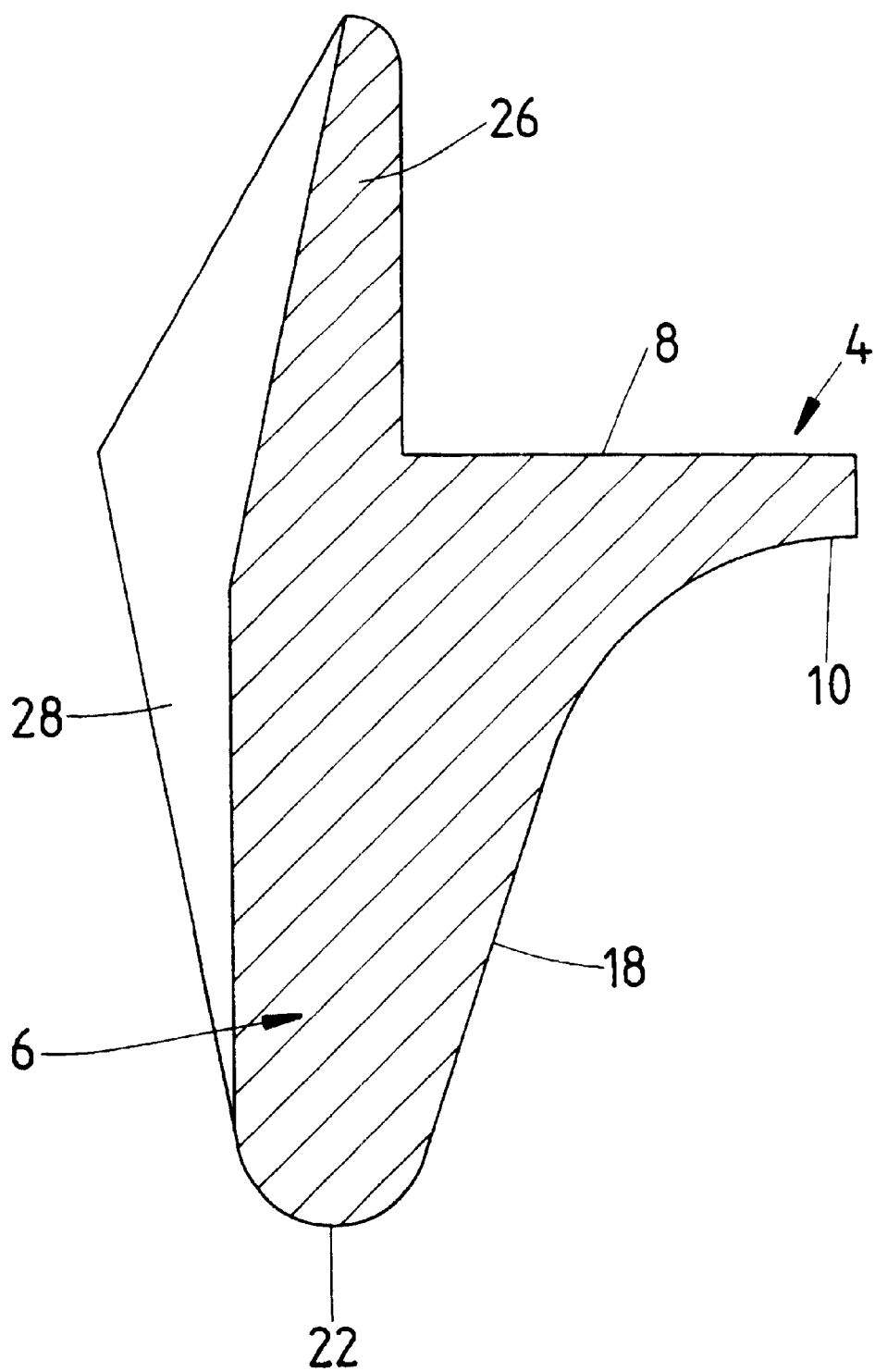
FIG. 6 is a schematic sectional view along the line 6—6 of FIG. 1.

The horseshoe may include an upwardly projecting central toe clip 26, as best seen in FIGS. 3, 4 and 5. The toe clip 26 provides stability for the front of the hoof in the usual way. In the arrangement of the invention, the toe clip extends upwardly adjacent to an optional shallow recess 28 formed in the rib 6 at the front of the horseshoe, as shown in FIG. 6. In the illustrated embodiment, the tongue is centred. There could, however, be two or more toe clips or tongues equidistant from a midline, on either side of the base.

Figure 7:
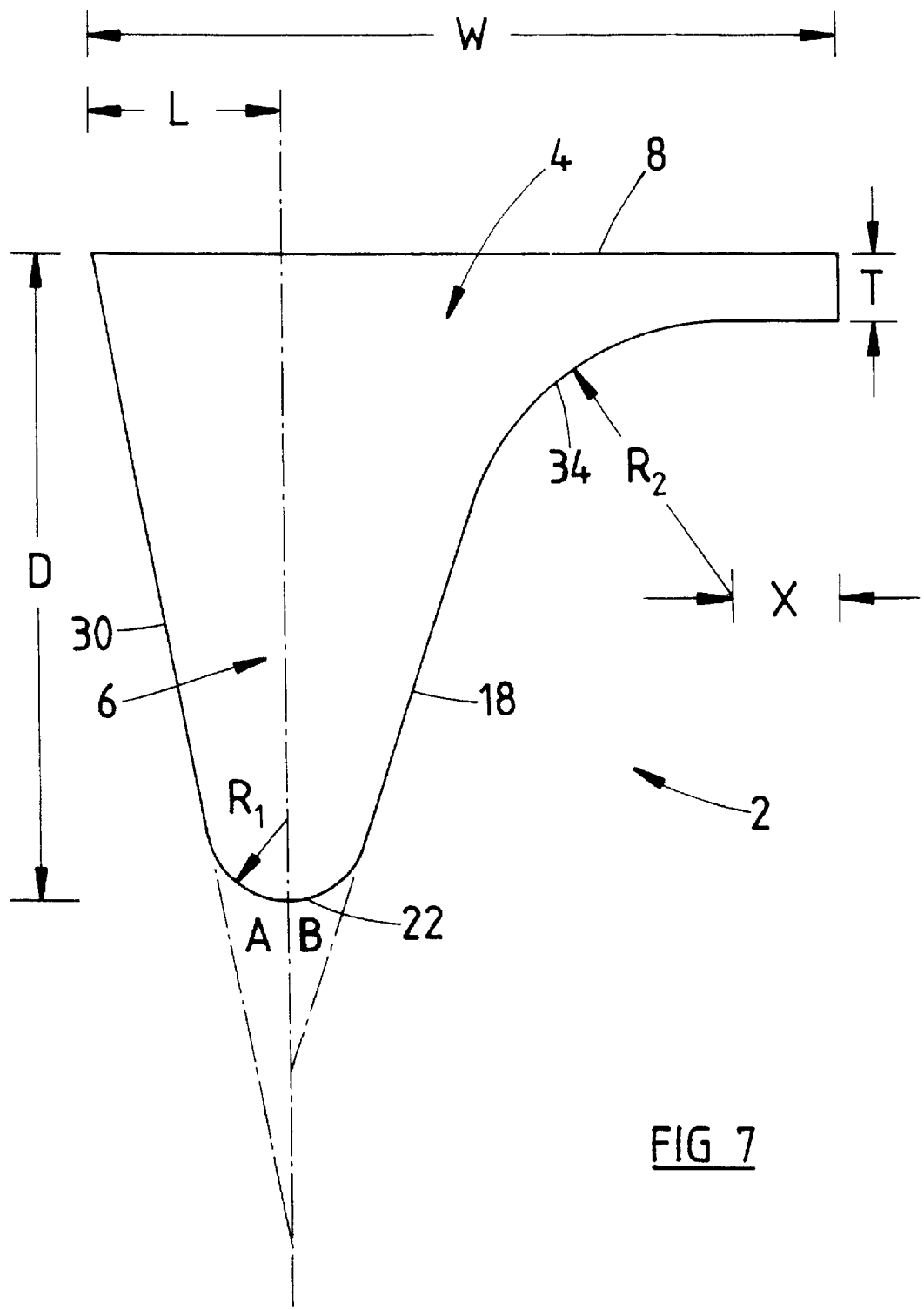
FIG. 7 is a schematic sectional view along the line 7—7 of FIG. 1.

FIGS. 7 and 8 show in more detail the profile of the rib 6. It will be seen that the outer face 30 of the rib tapers inwardly at an angle A to a centreline whereas the inner face 18 tapers inwardly at an angle B to the centreline. In accordance with the invention, the angle A is smaller than the angle B. Preferably further, the sum of the angles A and B is in the range 20° to 60°. In the illustrated arrangement the preferred values are as follows: angle A about 13°, the angle B about 17°.

The bottom edge of the rib preferably has a radius $R_1$ in the range 1 to 5 mm and preferably 2 mm. The curved portion 34 which sweeps inwardly from the face 18 to the underside surface 10 of the base preferably has a radius $R_2$ in the range 3 to 10 mm. In the illustrated arrangement the preferred value for $R_2$ is 7 mm.

Preferably further, the depth D of the rib 6 as measured from the upper face 8 is about 12 mm. In the illustrated embodiment, the preferred value for the width W is 20 mm.

The depth D of the rib 6 can be varied to meet requirements. It is thought that a minimum of about 6 mm to a maximum of about 35 mm would be appropriate. Normally the depth D would be less than 20 mm and preferably in the range 9 mm to 17mm. As indicated above, the most preferred depth is about 12 mm, and this is preferably the value for different sizes of horseshoes with other dimensions being scaled accordingly.

The thickness T of the base portion 4 is in the range 1.5 to 3 mm and preferably 2 mm. The centre line 32 is preferably offset by a distance L as measured from the outer edge of the base portion 4 by a distance in the range 6 to 10 mm and preferably 8 mm. The radius 2 preferably has a centre which is offset by a distance X from the inner edge of the base portion These dimensions are summarised in Table 1 below.

TABLE 1

|  | range mm or degrees | typical dimension mm or degrees | approximate fraction of depth D |
|---|---|---|---|
| base width W | 15–25 | 20 | 1.25–2.5 |
| total depth D | 9–17 | 12 | — |
| thickness T | 1.5–3 | 2 | 0.13–0.25 |
| length L | 6–10 | 8 | 0.03–0.85 |
| length X | 2–5 | 2.5 | 0.17–0.4 |
| radius $R_1$ | 1–5 | 2 | 0.08–0.4 |
| radius $R_2$ | 3–10 | 7 | 0.25–0.85 |
| angle A&B | 20–60 | 30 | — |
| angle A | — | 13 | — |
| angle B | — | 17 | — |

The rib 6 may include a number of hardened wear pins or plates 36 which are moulded into the horseshoe or are press fit therein. The lower end of the pins or plates 36 can be shaped so as to be contiguous with the rounded bottom edge 22 of the rib. The wear pins or plates 36 would reduce the propensity for the rib 6 to be worn away by abrasion of the rib 6 on hard surfaces.

The horseshoe 2 may be formed from a number of materials. Preferably a light weight metal is used such as titanium or aluminium-titanium alloy. Preferably the material has a Brinell hardness of greater than 100. The following aluminium alloys are suitable: L.M.4, L.M.916, L.M.25, L.M.30, A.C.601, 2014-T4, 2014-T6, 2024-T42, 6061-T6, 6351, 6063, 7005, 8011-H12, 8011-H14, 8011-H16 and 8011-H18.

It is also possible to use synthetic moulded plastics material which may or may not be reinforced by strengthening fibres such as Kevlar or the like. It is possible that ceramic materials may also be used.

The horseshoe of the invention can be made in various sizes as accepted in the trade. A nominal diameter of say 110 mm would be appropriate and increases in diameter in increments of about 6 to 7 mm depending on demand. It is envisaged that the maximum diameter would not be more than say 180 mm.

It will be appreciated by those skilled in the art that the downwardly projecting rib will facilitate penetration into soft ground, thereby affording greater traction to a horse. This can be particularly useful to horses competing in horse racing, whether galloping or trotting. The better traction would also be of importance in many equestrian events such as jumping, show riding and the like. Injuries are thought to be minimised by reduction of excessive slippage that normally occurs.

Because the rib 6 is tapered, there is a finite time during which the rib penetrates the ground. This causes a cushioning effect because there is a less sudden deceleration of the hoof compared to a situation where the lower face of the horseshoe is basically flat. The cushioning effect is thought to minimise the possibility of injury to the legs and hooves of the animal.

In the embodiment illustrated in FIGS. 1 to 8, nail holes are provided for fixing the horseshoe to the hooves. It is to be understood however that adhesives could be used for this purpose.

It is also understood that wedges and/or packing can be placed between the hoof and the shoe in order to change or alter the gait of the horse. The wedging and/or packing can be separate elements or incorporated into the shoe moulding.

The horseshoe shown in FIGS. 1 and 2 has a somewhat circular shape which is appropriate for front hooves of a horse. In accordance with normal practice, the shape of the shoes for the rear hooves can be a somewhat more elongated shape, as is the case for pacers' and trotters' front hooves.

Figure 9:
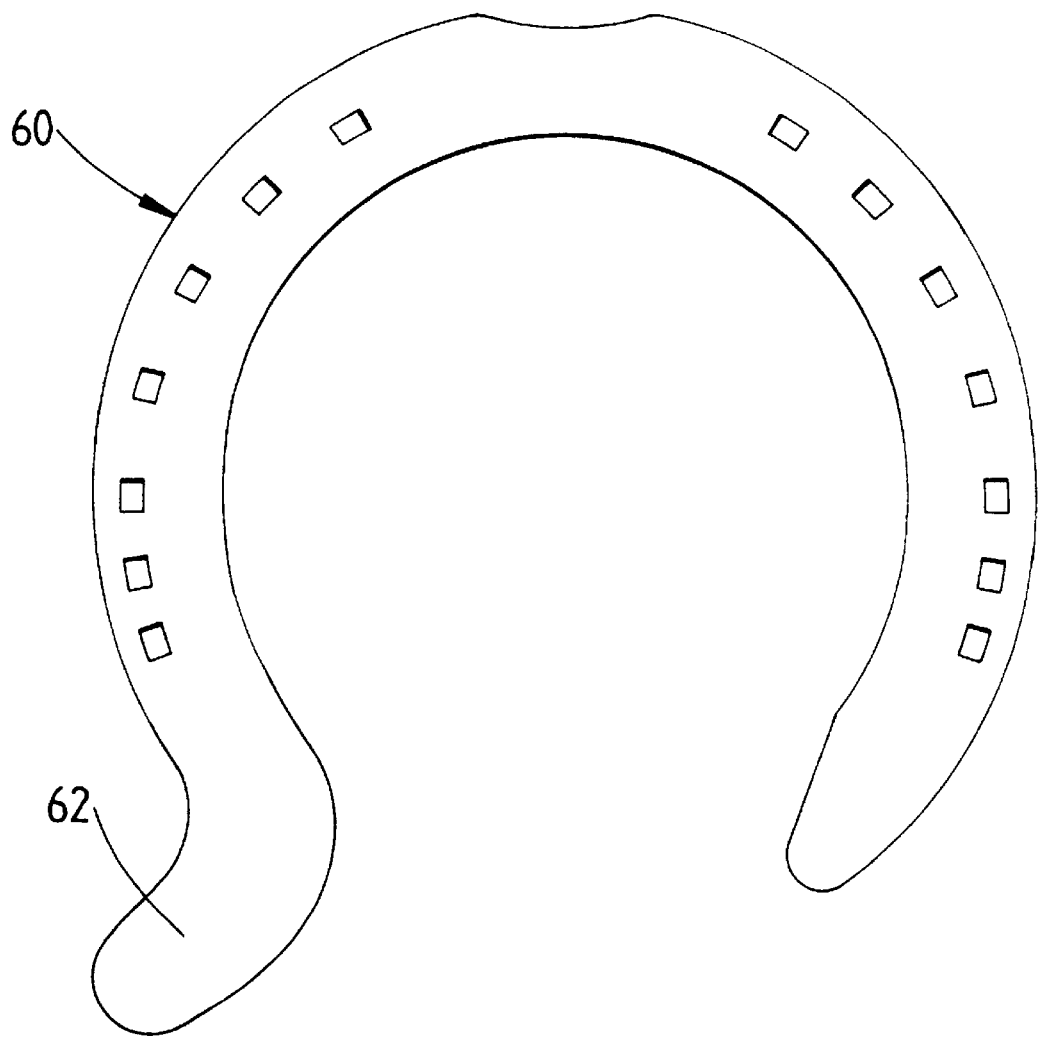
FIGS. 9 and 10 are plan views of left and right rear horseshoes in accordance with a further embodiment of the invention.
Figure 10:
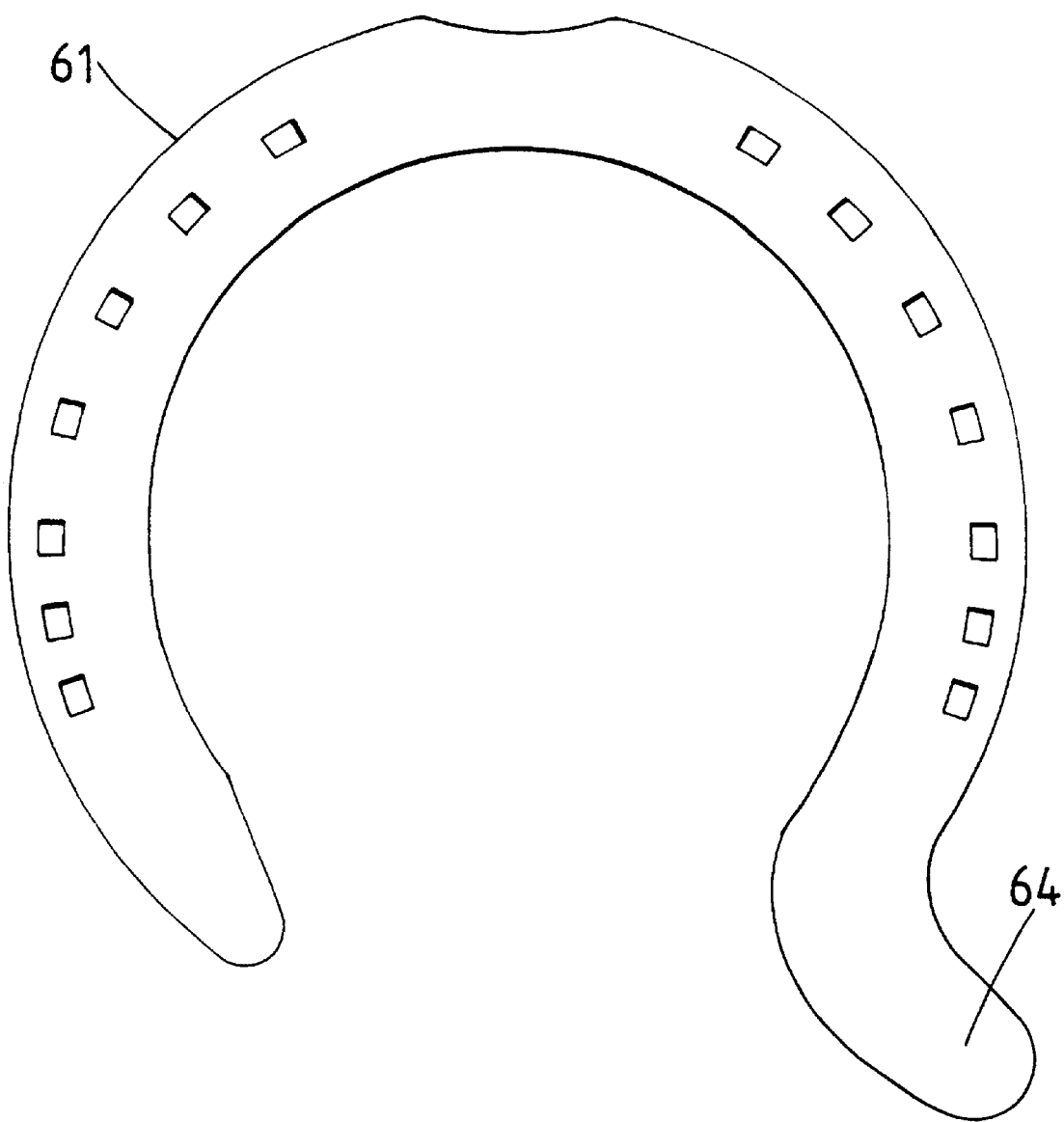

FIGS. 9 and 10 are plan views of left and right rear horseshoes 60 and 61 in accordance with a further embodiment of the invention. The horseshoes 60 and 61 are designed for use with pacing or trotting horses. These horseshoes include rear extensions 62 and 64 which assist in achieving the correct gait for a pacer or trotter. It is preferred that the extensions 62 and 64 include the rib 6. The variations of the rib 6 for the shoes 60 and 61 can be the same as in other embodiments.

Many modifications will be apparent to those skilled in the art without departing from the spirit and scope of the invention.

What is claimed is:

1. A horseshoe (2) comprising:
   a base portion (4) having a base surface (8) which, in use, is adjacent the hoof of a horse; and
   an integral flange portion (6) which projects downwardly from the base portion,
   said flange portion extending substantially along the entire length of the base portion;
   said flange portion comprising, in transverse cross-section, first, second, third and fourth portions (30, 22, 18, 34), the first and third portions (30, 18) being substantially straight and the first portion (30) defining at least in part an outer side of the horseshoe;
   the second portion (22) being a convex curve merging smoothly into the first and third portions (30, 18);
   the fourth portion (34) being a concave curve which merges smoothly from the third portion to the base portion; and wherein
   the first and third portions forming a wedge shape which decreases in width in a direction away from the base portion;
   whereby, in use, the wedge shape provides a cushioning effect to the shoe as it strikes the ground, reaction forces increasing as the wedge shape increases penetration into the ground and wherein the flange portion (6) has a depth (D), as measured perpendicularly from the base surface (8) and the base portion (4) has a base width (W) and wherein the ratio of the width (W) to the depth (D) is in the range 1.25–2.5.

2. A horseshoe as claimed in claim 1 wherein the first and third portions are inclined to one another such that the wedge shape has an apex angle in the range 20° to 60°.

3. A horseshoe as claimed in claim 1 wherein the apex angle is about 30°.

4. A horseshoe as claimed in claim 1 wherein the second portion (22) has a radius of curvature ($R_1$), in the range 1 mm to 5 mm.

5. A horseshoe as claimed in claim 4 wherein said radius ($R_1$) is about 2 mm.

6. A horseshoe as claimed in claim 4, said radius ($R_1$) is centred on a centre line (32) which is perpendicular to said base surface (8) and wherein the centre line is offset by a distance (L) from an outer edge of the base portion.

7. A horseshoe as claimed in claim 6 wherein the first and third portions (30,18) are inclined to the centreline at first and second acute angles (A,B).

8. A horseshoe as claimed in claim 7 wherein the sum of the acute angles (A,B) is in the range 20° to 60°.

9. A horseshoe as claimed in claim 8 wherein said sum is about 30°.

10. A horseshoe as claimed in claim 9 wherein the first angle is less than the second angle.

11. A horseshoe as claimed in claim 10 wherein the first angle is about 13° and the second angle is about 17°.

12. A horseshoe as claimed in claim 7 wherein said distance (L) is in the range 6 mm to 10 mm.

13. A horseshoe as claimed in claim 12 wherein said distance (L) is about 8 mm.

14. A horseshoe as claimed in claim 13 wherein the base portion (4) has a thickness (T) and the ratio of the thickness (T) to the depth (D) is in the range 0.13–0.25.

15. A horseshoe as claimed in claim 14 wherein the second portion (22) has a radius ($R_1$) and wherein the ratio of the radius ($R_1$) to the depth (D) is in the range 0.08–0.25.

16. A horseshoe as claimed in claim 15 wherein the fourth portion (34) has a radius ($R_2$) and wherein the ratio of the radius ($R_2$) to the depth (D) is in the range 0.4–0.85.

17. A horseshoe as claimed in claim 1 wherein the fourth portion (34) has a radius ($R_2$) in the range 3 mm to 10 mm.

18. A horseshoe as claimed in claim 17 wherein the radius ($R_2$) of the fourth portion is about 7 mm.

19. A horseshoe as claimed in claim 1 wherein the base portion (4) has a base width (W) which is in the range 15 mm to 25 mm.

20. A horseshoe as claimed in claim 19 wherein the base width (W) is about 20 mm.

21. A horseshoe as claimed in claim 20 wherein flange portion (6) has a depth (D), as measured perpendicularly from the base surface (8), which is in the range 9 mm to 17 mm.

22. A horseshoe as claimed in claim 21 wherein said depth (D) is about 12 mm.

23. A horseshoe as claimed in claim 1 wherein a toe clip or tongue (26) projects upwardly from a central part of the base portion (4).

24. A horseshoe as claimed in claim 1 wherein the horseshoe includes nail holes (16) including rebates (20) for receipt of the heads of the nails.

25. A horseshoe as claimed in claim 24 wherein said rebates (20) in cross-section include the second and third portions (22,18).

* * * * *